United States Patent [19]

Buschmann

[11] Patent Number: 4,723,412
[45] Date of Patent: Feb. 9, 1988

[54] HYDRAULIC BRAKE SYSTEM FOR AUTOMOTIVE VEHICLES

[75] Inventor: Gunther Buschmann, Griesheim, Fed. Rep. of Germany

[73] Assignee: ITT Industries, Inc., New York, N.Y.

[21] Appl. No.: 708,978

[22] Filed: Mar. 7, 1985

[30] Foreign Application Priority Data

Mar. 10, 1984 [DE] Fed. Rep. of Germany ....... 3408872

[51] Int. Cl.4 .............................................. F15B 7/00
[52] U.S. Cl. ..................................... 60/545; 60/418; 60/431; 60/582
[58] Field of Search ................. 60/595, 582, 418, 431, 60/545

[56] References Cited

U.S. PATENT DOCUMENTS

| | | | |
|---|---|---|---|
| 3,080,718 | 3/1963 | Clary | 60/431 |
| 3,886,848 | 6/1975 | Budecker et al. | 91/516 |
| 3,922,854 | 12/1975 | Coeurderoy | 60/418 |
| 3,963,039 | 6/1976 | Coeurderoy | 60/413 |
| 3,976,158 | 8/1976 | Shaffer | 60/418 |
| 3,978,667 | 9/1976 | Ohara | 60/413 |
| 4,206,605 | 6/1980 | Mehren et al. | 60/545 |
| 4,398,389 | 8/1983 | Horvath | 60/431 |
| 4,475,336 | 10/1984 | Runkle | 60/545 |
| 4,477,125 | 10/1984 | Belart et al. | 60/582 |

Primary Examiner—Abraham Hershkovitz
Attorney, Agent, or Firm—James B. Raden; William J. Michals

[57] ABSTRACT

A hydraulic brake system for automotive vehicles with a master brake cylinder and with a hydraulic power booster (1) connected upstream of the master brake cylinder, in which a pressure medium pump (6) drivable by an electric motor (9) is employed for providing auxiliary hydraulic energy. The drive of the pressure medium pump (6) may be switched on by a pressure contact (13) of a pressure accumulator (4), on the one hand, and by a brake pedal contact (11), on the other hand. In the unbraked operation of the automotive vehicle, the pressure medium accumulator is permanently kept on a pressure level sufficient for an initial actuation of the brake. A valve assembly is provided which establishes a hydraulic connection between the outlet of the pressure medium pump (6) and the pressure port of the hydraulic power booster (1). An electromagnetically actuatable two-way/two-position directional control valve (5) is connected to the valve assembly (7), which valve (5) is normally open and which is adapted to be switched to its closed position by a brake pedal contact (11).

2 Claims, 1 Drawing Figure

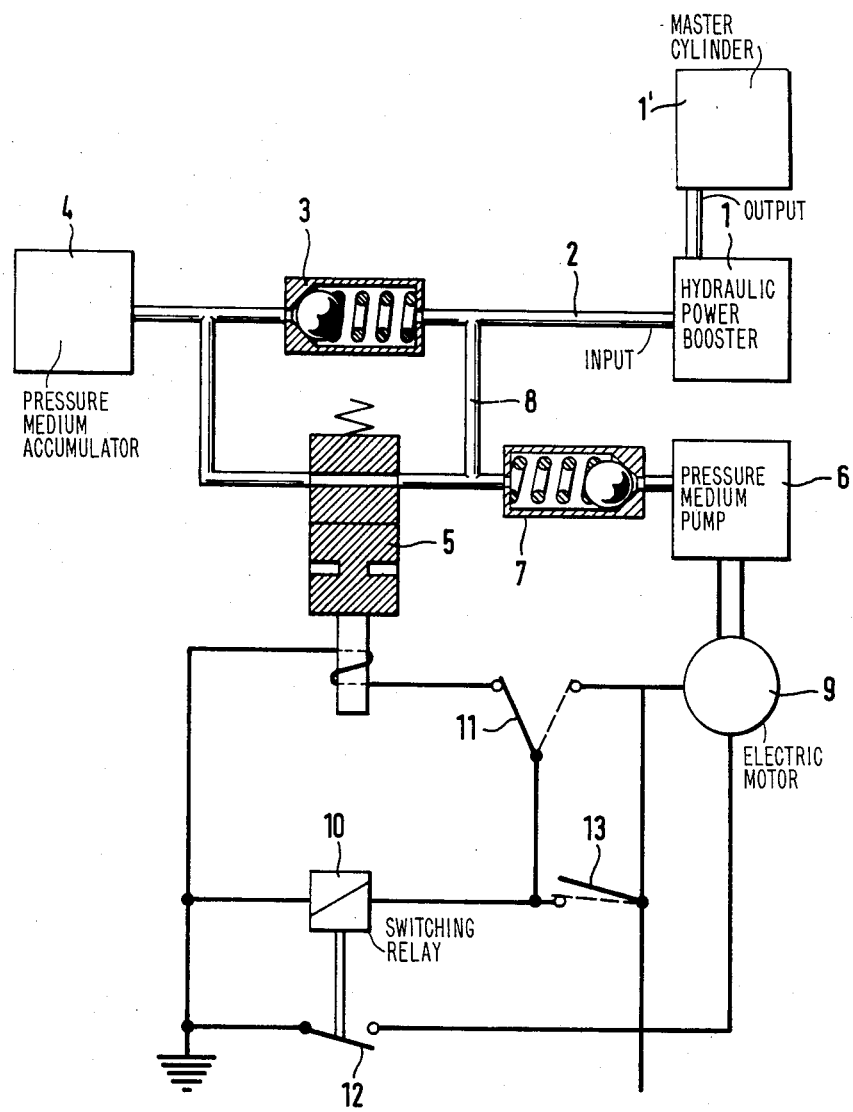

HYDRAULIC BRAKE SYSTEM FOR AUTOMOTIVE VEHICLES

BACKGROUND OF THE INVENTION

The present invention relates to a hydraulic brake system for automotive vehicles with a master brake cylinder and with a hydraulic power booster connected upstream of the master brake cylinder. An electromotively drivable pressure medium pump is employed for providing auxiliary hydraulic energy. The drive of the pump may be switched on by a contact of a pressure accumulator, on the one hand, and by a brake pedal contact, on the other hand, wherein, in the unbraked operation of the automotive vehicle, the pressure accumulator is permanently kept on a pressure level sufficient for an initial actuation of the brake. A valve assembly is provided which permits a connection between the outlet of the pressure medium pump and the port of the power booster.

Hydraulic brake systems for automotive vehicles of the type described are known. In these systems, a hydraulic pressure accumulator with a relatively small accumulator volume serves to make available auxiliary hydraulic energy in the initial phase of braking. After this initial phase of braking in respect of the energy supply has been bridged by the pressure medium stored in the pressure accumulator, the actual energy supply of the hydraulic power booster will be effected by an electromotively driven pressure medium pump which, at this point of time, delivers a medium flow or, respectively, generates a hydraulic pressure which largely corresponds to the hydraulic pressure in stationary operation.

Another component part of the known brake systems is a hydraulically controllable valve which can be governed by the hydraulic pressure in the pressure chamber of the hydraulic power booster. In each initial phase of braking, said valve is switched by the pressure developing in the pressure chamber of the hydraulic power booster to assume a position in which there is interruption of a connection between the outlet of the pressure medium pump and the hydraulic pressure accumulator. Upon each brake actuation, first the pressure accumulator is discharged via the valve to the pressure chamber of the hydraulic power booster.

The essential advantage of the known systems is that the pressure medium pump is in permanent operation during braking only. Apart from that, the drive of the pressure medium pump is switched on only if the pressure prevailing in the pressure accumulator drops below a predeterminable valve. It follows that the brake system necessitates a relatively low electric energy consumption and that the auxiliary hydraulic energy required is available already at the commencement of braking. The difficulties arising in the start-up phase of the pressure medium pump in respect of its delivery will become inapplicable by use of the pressure accumulator.

In the device described, the pressure-controlled valve is of relatively complicated design and therefore incurs corresponding manufacturing and assembling costs. It is therefore an object of the present invention to considerably simplify a device of the species initially referred to.

SUMMARY OF THE INVENTION

This object is achieved according to the present invention in that connected to the valve assembly is an electromagnetically actuatable two-way/two-position directional control valve which is normally closed and which is caused to assume its opened position by a brake pedal contact. Such an embodiment economizes a hydraulically actuatable valve which, as is known, incurs relatively high manufacturing costs. The hydraulically actuatable valve is substituted by an electromagnetically actuatable two-way/two-position directional control valve which in normal driving operation (without braking) is energized by a brake pedal contact such as to admit a connection between the pressure medium pump and the pressure medium accumulator. The electric contact arranged at the pressure medium accumulator which closes below a predeterminable accumulator volume determines the pressure level of the pressure accumulator in a like operation. It is furthermore arranged for that connected in parallel to the two-way/two-position directional control valve is a non-return valve which prevents a medium flow from the pressure medium pump to the pressure medium accumulator when the two-way/two-position directional control valve is in its closed position.

BRIEF DESCRIPTION OF THE DRAWING

An embodiment of this invention will be described in more detail in the accompanying drawing wherein the single FIGURE illustrates a wiring diagram in accordance with the present invention.

DETAILED DESCRIPTION

In the drawing, reference numeral 1 designates a hydraulic power booster which is connected upstream of a master cylinder 1' and which is in communication with a pressure medium accumulator 4 via a pressure line 2 and a non-return valve 3. Connected in parallel to said non-return valve 3 is a two-way/two-position direction control valve 5 which assumes an opened position in normal driving operation so that a pressure medium pump 6 is enabled to generate a predefinable pressure in the pressure medium accumulator 4 via another non-return valve 7. Via a pressure line 8, the outlet of the pressure medium pump 6 is likewise directly connectible to the hydraulic power booster 1 via the non-return valve 7.

The pressure medium pump 6 can be driven electromotively by a motor 9, the energy supply directed to the electric motor 9 being controlled by a switching relay 10. Another component of the described device is a change-over contact 11 which assumes the position discernible from the drawing in the unbraked operation of the automotive vehicle. Said electric change-over contact 11 is, for example, controlled by a travel-responsive switch fitted at the brake pedal. As an alternative, it is possible that the change-over contact 11 is governed by a signal derived from the operating condition of the stop lights.

As long as the change-over contact 11 adopts the position to be seen from the drawing, the two-way/two-position directional control valve 5 is energized so that there is hydraulic connection between the pressure medium pump 6 and the accumulator 4. Nevertheless, the switching relay 10 or, respectively, its associated switching contact 12 is actuable via a switch 13 which scans the charge of the pressure medium accumulator 4 and which will close as soon as the pressure prevailing in the pressure medium accumulator 4 falls below a predeterminable level.

It shall be assumed in the following description of the mode of operation of the device that the vehicle is unbraked and that the pressure medium accumulator's 4 charge is sufficient, hence the change-over contact 11 and the switch 13 assuming their positions as shown in the drawing. Upon brake application, the change-over contact 11 is switched over so that voltage is applied to the electric motor 9 by way of the excited switching relay 10 or the contact 12, respectively. When such switching-over of the change-over contact 11 is effected, the magnet coil of the two-way/two-position directional control valve 5 will be de-energized, as a result whereof the valve 5 adopts a closed position in which there is closure of a hydraulic connection between the pressure medium pump 6 and the pressure medium accumulator 4. Thereupon, the pressure medium accumulator 4 discharges by way of the non-return valve 3 and the pressure line 2 to the hydraulic power booster 1 and ensures sufficient pressure medium supply of the hydraulic power booster 1 in the initial phase of braking. The electric motor 9 and the pressure medium pump 6 are permanently in operation as long as the change-over contact 11 assumes the switching position indicated in dotted lines. The operation of the electric motor 9 is independent of the position of the switch 13 in this operating condition.

The pressure medium accumulator 4 having ensured the provision of auxiliary hydraulic energy in the initial phase of braking, it will be already within this initial phase of braking that the pressure medium pump will have reached an operating condition in which the medium flow it delivers is alone sufficient to feed the hydraulic power booster 1. As has been previously outlined, the electric motor 9 remains switched on as long as the brake pedal is depressed. The pressure medium pump 6 feeds via the non-return valve 7 and the pressure lines 2, 8 directly to the hydraulic power booster 1, while the electromagnetically actuatable two-way/two-position directional control valve 5 is closed.

When braking is terminated, the change-over contact 11 will re-assume the position discernible from the drawing in which the two-way/two-position directional control valve 5 is energized and assumes an opened position, thus permitting the pressure medium accumulator 4 to be charged via the non-return valve 7. The state of charge is monitored by the switch 13, as has been explained before.

What is claimed is:

1. A hydraulic brake system for automotive vehicles with a master cylinder operatively connected to a hydraulic power booster, said power booster having a pressure port input and an output connected to said master cylinder for applying pressure to said master cylinder, wherein an electromotively drivable pressure medium pump is employed for providing auxiliary hydraulic energy into a pressure accumulator, said pump being switched on by one of a contact of said pressure accumulator, and by a brake pedal contact, wherein, in an unbraked operation of said system, said pressure accumulator is kept permanently at a pressure level sufficient for an initial actuation of the brake system, and wherein a valve assembly is provided which permits a connection between an outlet of the pressure medium pump and said pressure port of said power booster, wherein an electromagnetically actuable two-way/two-position directional control valve (5) is connected between said pressure accumulator and said pressure port which directional control valve is normally open and which is adapted to switch to its closed position in response to said brake pedal contact (11).

2. A hydraulic brake system as claimed in claim 1, wherein a check valve (3) is connected in parallel to the electromagnetically actuable two-way/two-position directional control valve (5) which enables medium flow from the pressure medium accumulator (4) to the hydraulic power booster (1) when said directional control valve is closed.

* * * * *